United States Patent
Horak

(10) Patent No.: US 12,269,043 B2
(45) Date of Patent: Apr. 8, 2025

(54) BEAD MANIPULATION IN A CONSUMABLE

(71) Applicant: Andrew Alliance S.A., Canton of Geneva (CH)

(72) Inventor: Giorgio Horak, Geneva (CH)

(73) Assignee: Andrew Alliance S.A. (CH)

( * ) Notice: Subject to any disclaimer, the term of this patent is extended or adjusted under 35 U.S.C. 154(b) by 243 days.

(21) Appl. No.: 17/218,876

(22) Filed: Mar. 31, 2021

(65) Prior Publication Data

US 2021/0308691 A1    Oct. 7, 2021

Related U.S. Application Data

(60) Provisional application No. 63/004,818, filed on Apr. 3, 2020.

(51) Int. Cl.
  *B03C 1/32*  (2006.01)
  *B03C 1/01*  (2006.01)
  (Continued)

(52) U.S. Cl.
  CPC .................. *B03C 1/32* (2013.01); *B03C 1/01* (2013.01); *B03C 1/288* (2013.01); *G01N 35/00584* (2013.01); *B03C 2201/18* (2013.01); *B03C 2201/22* (2013.01); *G01N 2035/00564* (2013.01)

(58) Field of Classification Search
  CPC .. B03C 1/32; B03C 1/01; B03C 1/288; B03C 1/284; B03C 2201/18; B03C 2201/22; B03C 2201/26; G01N 35/00584; G01N 35/0098; G01N 2035/00564
  See application file for complete search history.

(56) References Cited

U.S. PATENT DOCUMENTS 3,219,318 A   11/1965  Abe
4,927,545 A    5/1990  Roginski
(Continued)

FOREIGN PATENT DOCUMENTS

CN   101268189 A    9/2008
CN   106102898 A   11/2016
(Continued)

OTHER PUBLICATIONS

International Preliminary Report on Patentability in PCT/IB2021/052706 mailed on Oct. 13, 2022.
(Continued)

*Primary Examiner* — Liam Royce
(74) *Attorney, Agent, or Firm* — Schmeiser, Olsen & Watts LLP; Victor J. Baranowski

(57) ABSTRACT

A magnetic separator for a liquid handling system includes a base unit having at least one receiver configured to receive a consumable, the at least one receiver being dimensioned to receive the consumable in a predefined location at least partially within the base unit. The magnetic separator further includes a magnet system located within the base unit proximate to the at least one receiver, the magnet system including a first separation magnet configured to perform separation of beads located within the consumable when the first magnet is located proximate to the consumable, and a movement system configured to move the first magnet in at least two directions in order to adapt to a shape of the consumable.

21 Claims, 8 Drawing Sheets

(51) Int. Cl.
  *B03C 1/28* (2006.01)
  *G01N 35/00* (2006.01)

(56) References Cited

U.S. PATENT DOCUMENTS

| | | | |
|---|---|---|---|
| 5,429,010 A | 7/1995 | Lohndorf et al. | |
| 5,647,994 A | 7/1997 | Tuunanen et al. | |
| 5,733,458 A | 3/1998 | Kitazawa et al. | |
| 5,897,783 A | 4/1999 | Howe et al. | |
| 5,942,124 A | 8/1999 | Tuunanen | |
| 5,985,153 A | 11/1999 | Dolan et al. | |
| 6,187,270 B1 | 2/2001 | Schmitt et al. | |
| 6,323,035 B1 | 11/2001 | Kedar et al. | |
| 6,368,561 B1 | 4/2002 | Rutishauser et al. | |
| 8,574,515 B2 | 11/2013 | Ellis et al. | |
| 9,753,029 B2 | 9/2017 | Gandini et al. | |
| 10,788,503 B2 | 9/2020 | Horak | |
| 2001/0048894 A1 | 12/2001 | Schmidt et al. | |
| 2002/0028926 A1 | 3/2002 | Shoji et al. | |
| 2003/0089581 A1 | 5/2003 | Thompson et al. | |
| 2003/0127396 A1 | 7/2003 | Siddiqi | |
| 2003/0146166 A1 | 8/2003 | Ras et al. | |
| 2004/0164571 A1 | 8/2004 | Pedrazzini | |
| 2004/0197780 A1 | 10/2004 | McKernan et al. | |
| 2006/0039822 A1 | 2/2006 | Domack | |
| 2007/0077580 A1* | 4/2007 | Ikeda | B01L 7/525 435/6.16 |
| 2008/0170966 A1 | 7/2008 | Cook et al. | |
| 2008/0296157 A1 | 12/2008 | Bauer et al. | |
| 2010/0006509 A1 | 1/2010 | Hornes | |
| 2010/0060893 A1* | 3/2010 | Norton | G01N 1/40 356/244 |
| 2010/0200511 A1 | 8/2010 | Oder et al. | |
| 2010/0285606 A1 | 11/2010 | Phillips et al. | |
| 2012/0196774 A1 | 8/2012 | Fournier et al. | |
| 2013/0157273 A1 | 6/2013 | Frank et al. | |
| 2013/0273552 A1 | 10/2013 | Ohashi | |
| 2013/0280143 A1 | 10/2013 | Zucchelli et al. | |
| 2013/0288259 A1 | 10/2013 | Tajima | |
| 2014/0106386 A1 | 4/2014 | Umeno et al. | |
| 2015/0090664 A1 | 4/2015 | Nokleby et al. | |
| 2015/0107995 A1 | 4/2015 | Sista et al. | |
| 2015/0118688 A1 | 4/2015 | Weidemaier et al. | |
| 2015/0127157 A1 | 5/2015 | Matsukuma | |
| 2015/0135829 A1 | 5/2015 | Whitesides et al. | |
| 2015/0337400 A1 | 11/2015 | Wilson et al. | |
| 2016/0201114 A1* | 7/2016 | Ohashi | B03C 1/0332 435/6.12 |
| 2017/0073667 A1 | 3/2017 | Ohashi et al. | |
| 2017/0247682 A1 | 8/2017 | Sakai et al. | |
| 2017/0299619 A1 | 10/2017 | Zucchelli | |
| 2019/0039034 A1* | 2/2019 | Siow | B01F 31/27 |
| 2020/0110081 A1 | 4/2020 | Gandini et al. | |
| 2021/0388307 A1* | 12/2021 | Chen | B01F 27/112 |

FOREIGN PATENT DOCUMENTS

| | | |
|---|---|---|
| EP | 0358948 A2 | 3/1990 |
| EP | 0589636 A1 | 3/1994 |
| EP | 0601213 A1 | 6/1994 |
| EP | 0737110 B1 | 9/1999 |
| EP | 0965842 A1 | 12/1999 |
| EP | 1621890 A1 | 2/2006 |
| EP | 2036635 A1 | 3/2009 |
| EP | 3272419 A1 | 1/2018 |
| GB | 2069974 A | 9/1981 |
| JP | H02161358 A | 6/1990 |
| JP | H0436460 U | 3/1992 |
| JP | H06198214 A | 7/1994 |
| JP | H0829424 A | 2/1996 |
| JP | H0852378 A | 2/1996 |
| JP | H11187862 A | 7/1999 |
| JP | 2002085060 A | 3/2002 |
| JP | 2003254877 A | 9/2003 |
| JP | 2008510993 A | 4/2008 |
| JP | 2012117878 A | 6/2012 |
| JP | 2015085490 A | 5/2015 |
| WO | 2007148734 A1 | 12/2007 |
| WO | 2008014223 A2 | 1/2008 |
| WO | 2009111769 A2 | 9/2009 |
| WO | 2015136689 A1 | 9/2015 |
| WO | 2017158425 A1 | 9/2017 |

OTHER PUBLICATIONS

International Search Report & Written Opinion in PCT/IB2021/052706 mailed on Jun. 7, 2021.
Examination Report in European Patent Application No. 21717552.0 mailed on Sep. 28, 2023.
Examination Report in European Patent Application No. 21717552.0 mailed on Oct. 23, 2024.

* cited by examiner

BEAD MANIPULATION IN A CONSUMABLE

RELATED APPLICATION

This application claims the benefit of the earlier filing date of U.S. Provisional Patent Application Ser. No. 63/004,818 filed Apr. 3, 2020 and titled "Bead Manipulation in a Consumable," the entirety of which is incorporated herein by reference.

FIELD OF THE INVENTION

The invention relates generally to the field of automation of chemical, biological and biochemical processes or reactions. More particularly, the invention relates to devices and methods for separation of magnetic particles in consumables of liquid handling systems.

BACKGROUND

The use of micro and nano-particles are of great interest for many technological applications: bio-sensing applications, medical and biological applications, such as modified drug delivery during medical treatment, bio-separation, purification and screening of antibodies, proteins, and the like.

In general, these micro and nano-particles are referred to as "beads." In general, we define as "bead" hereinafter as any tag, barcode, molecular beacon, sponge or particle ranging in size from a few Angstroms to several millimeters, capable to selectively transport one or more specific components under the influence of an external force.

In particular, magnetic separation technology has become a fundamental part of in DNA sequencing. In fact, magnetic separation techniques not only are relatively cheap and highly scalable methods, but also offers many advantages with respect to similar methods, such as subjecting the sample to very little mechanical stress, high recovery efficiency and purification of the sample.

Magnetic beads are used as carriers of proteins, cell, antibodies, antigens and nucleic acids by using a suitable coating on the external surface of the particle. In order to be able to bind and capture the desired target analyte, the magnetic beads have to be coated with a ligand that specifically binds to the target. The choice of the type of ligand will entirely depend on the target molecule that has to be captured.

The central core of the beads is magnetic and it is responsible of the ability to respond to an external magnetic field. Metal oxides are typically preferred because they are more stable to oxidation with respect to pure metals. The beads may possess single domain or multi-domain structure according to the size of the magnetic core. The size of beads mainly affects the coercivity: the smaller the beads are, the smaller is the coercivity. In particular, nanoparticles of the order of 5-15 nm are super-paramagnetic, whereas microparticles are ferromagnetic.

The magnetic and physical property of the beads are chosen according to the applications which the magnetic particles must be used for. Nanoparticles have the advantage of not having remanence, when the magnetic field is removed; at the same time, the magnetic force is so small that the viscous forces dominates: this implies a more difficult separation and movement of the particles.

In general, magnetic separation may be carried out with beads which show very weak integration with the poles of a magnet (paramagnetism), beads having high susceptibility to magnetization (ferromagnetism), beads which tend to become magnetized in a direction at 180° to the applied magnetic field (diamagnetism) or with ferromagnetic nanoparticles which shows superparamagnetism behavior.

In the magnetic bead separation, the first step is the binding of the sample to external coating of the beads. The liquid solution containing the target analyte is dispensed into a magnetic beads buffer. Typically, liquid mixing is carried out in order to increase the efficiency of the binding between the magnetic beads and the analyte.

After the binding step, the separation of the analyte is achieved by moving the beads by applying an external magnetic field. This will generate a force according to the following formula:

$$F = \nabla(m \cdot B)$$

A closer look at the formula shows that the magnetic force depends on the gradient of the magnetic field B and on the magnetic moment of the beads m. Since the gradient is the change of the quantity m B per unit distance, the magnetic field strongly depends on the distance between a magnet applying the magnetic field, and the beads.

When the magnetic field is applied, the magnetic beads become magnetized and start forming clusters, which move along the magnetic field gradient direction. After a certain amount of time (which depends on the quantity and dimension of the beads, intensity of the magnetic field gradient and viscosity of the solution liquid), the magnetic beads are pelleted in a defined region which depends on the line of the magnetic field.

At this point, the sample separation is achieved by isolating the beads from the remaining liquid solution. Typically, either the remaining liquid solution is evacuated or the magnetic bead cluster is moved into another vessel.

During separation, the distance between the magnetic field and the beads is important to control. However, this becomes difficult in many cases, such as the case where a container or other consumable is irregularly shaped. For example, some containers or consumables include a conical bottom in which the beads may cluster during the binding stage and prior to application of a magnetic field. It may be difficult to apply a magnetic field to the beads located at the conical bottom of such a consumable.

Further, during the binding step (prior to the application of the magnetic field) it is important to not have a magnetic field acting on the beads within a consumable. Such a magnetic field may jeopardize the workflow during the binding process. Thus, it is also important to create a system whereby the binding process is not affected by the magnetic field of the magnets that will eventually be used in the later separation step.

SUMMARY

In one embodiment, a magnetic separator for a liquid handling system comprises: a base unit having at least one receiver configured to receive a consumable, the at least one receiver being dimensioned to receive the consumable in a predefined location at least partially within the base unit; and a magnet system located within the base unit proximate to the at least one receiver, the magnet system including: a first separation magnet configured to perform separation of beads located within the consumable when the first magnet is located proximate to the consumable; and a movement system configured to move the first magnet in at least two directions in order to adapt to a shape of the consumable.

Additionally or alternatively, the magnet system further includes: a stationary magnet located in a stationary position within the base unit, wherein the stationary magnet is configured to deflect a magnetic field line of the first separation magnet away from the consumable received within the at least one receiver and to remove a residual magnetic field from the first separation magnet on beads located within the consumable.

Additionally or alternatively, the movement system includes a vertical axis configured to move the first separation magnet in a vertical direction and a horizontal axis configured to move the first separation magnet in a horizontal direction.

Additionally or alternatively, the at least one receiver is dimensioned to receive the consumable that extends in a cylindrical shape having a conical bottom, and wherein the movement system is configured to move the first separation magnet vertically along one side of the cylindrical shape such that a portion of the first separation magnet is in close proximity to the cylindrical shape of the received consumable, and wherein the movement system is configured to move the first separation magnet horizontally along one side of the conical bottom such that the portion or another portion of the first separation magnet is in close proximity to the conical body.

Additionally or alternatively, the first separation magnet is configured to remain in contact with the consumable or the receiver along an entire vertical height of the consumable and receiver.

Additionally or alternatively, the base unit includes at least three receivers, each being dimensioned to receive a separate consumable in a predefined location at least partially within the base unit, wherein the first separation magnet is configured to perform separation of beads located in the consumable within a first of the at least three receivers when the first separation magnet is located proximate the consumable, and wherein the magnet system further includes: a second separation magnet configured to perform separation of beads located within a second consumable within a second of the at least three receivers when the second separation magnet is located proximate the second consumable; and a third separation magnet configured to perform separation of beads located within a third consumable within a third of the at least three receivers when the third separation magnet is located proximate the third consumable.

Additionally or alternatively, the movement system is configured to move the first separation magnet, the second separation magnet, and the third separation magnet in unison.

Additionally or alternatively, the movement system is configured to move the first separation magnet, the second separation magnet, and the third separation magnet independently.

Additionally or alternatively, the movement system is configured to rotate the first separation magnet in addition to movement in the vertical direction and the horizontal direction.

Additionally or alternatively, the magnet system further includes: an opposing separation magnet configured to perform separation of beads located within the consumable when the opposing separation magnet is located proximate to the consumable, wherein the movement system is configured to move the opposing separation magnet in at least two directions in order to adapt to a shape of the consumable, and wherein the opposing separation magnet is located on an opposite side of the at least one receiver as the first separation magnet.

Additionally or alternatively, the opposing separation magnet is configured to rotate between a first position and a second position, wherein in the first position the magnetic field of the opposing separation magnet is in a first orientation and wherein in the second position the magnetic field of the opposing separation magnet is in a second orientation that is opposite the first orientation.

Additionally or alternatively, the magnet system further includes: a control system configured to detect the dimensions of at least one of the at least one receiver and the received consumable, wherein the control system is configured to automatically determine a movement process for the first separation magnet for performing separation of beads.

In accordance with another embodiment, a liquid handling system comprises: a magnetic separator including: a base unit having at least one receiver configured to receive a consumable, the at least one receiver being dimensioned to receive the consumable in a predefined location at least partially within the base unit; and a magnet system located within the base unit proximate to the at least one receiver, the magnet system including: a first separation magnet configured to perform separation of beads located within the consumable when the first separation magnet is located proximate to the consumable; and a movement system configured to move the first separation magnet in at least two directions in order to adapt to a shape of the consumable; and a liquid handling device including: a liquid handling automated movement system; a head configured to be moved by the automated liquid handling movement system; and at least one pipette attached to the head and configured to be insertable into and retractable from the at least one receiver of the base unit of the magnetic separator, the pipette configured to aspirate and dispense liquid from the consumable received in the at least one receiver.

In accordance with another embodiment, a method of separating beads comprises: receiving a consumable by a receiver of a base unit of a magnetic separator for a liquid handling system; performing, by the magnetic separator, a separation of beads located within the consumable by moving a first separation magnet of the magnetic separator in proximity to the consumable; and moving, by a movement system of the magnetic separator, the first separation magnet in at least two directions during the separation.

Additionally or alternatively, the method further comprises: deflecting the magnetic field of the first separation magnet away from the consumable by a second magnet of the magnetic separator; and removing a residual magnetic field from the first separation magnet on the beads located within the consumable by the second magnet.

Additionally or alternatively, the second magnet is a stationary magnet within the magnetic separator, and the method further comprises: moving the first separation magnet in proximity of the second magnet.

Additionally or alternatively, the moving the first separation magnet further includes: moving the first separation magnet along a vertical axis in a vertical direction; and moving the first separation magnet along a horizontal axis in a horizontal direction.

Additionally or alternatively, the consumable extends in a cylindrical shape having a conical bottom, wherein the moving the first separation magnet further includes: moving, by the movement system of the magnetic separator, the first separation magnet vertically along one side of the cylindrical shape such that a portion of the magnet is in close proximity to the cylindrical shape of the received consumable; and moving, by the movement system of the magnetic separator, the first separation magnet horizontally along one side of the conical bottom such that the portion or another portion of the magnet is in close proximity to the conical body.

Additionally or alternatively, the method further comprises: remaining in contact, by the first separation magnet, with the consumable or the receiver along an entire vertical height of the consumable and receiver.

Additionally or alternatively, the base unit includes at least three receivers, each being dimensioned to receive a separate consumable in a predefined location at least partially within the base unit, wherein the first separation magnet performs separation of beads located in the consumable within a first of the at least three receivers, and wherein the method further includes: performing, by the magnetic separator, a separation of beads located within a second consumable located in a second of the at least three receivers by moving a second separation magnet of the magnetic separator in proximity to the second consumable and moving, by a movement system of the magnetic separator, the second separation magnet in at least two directions during the separation; and performing, by the magnetic separator, a separation of beads located within a third consumable located in a third of the at least three receivers by moving a third separation magnet of the magnetic separator in proximity to the third consumable and moving, by a movement system of the magnetic separator, the third separation magnet in at least two directions during the separation.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
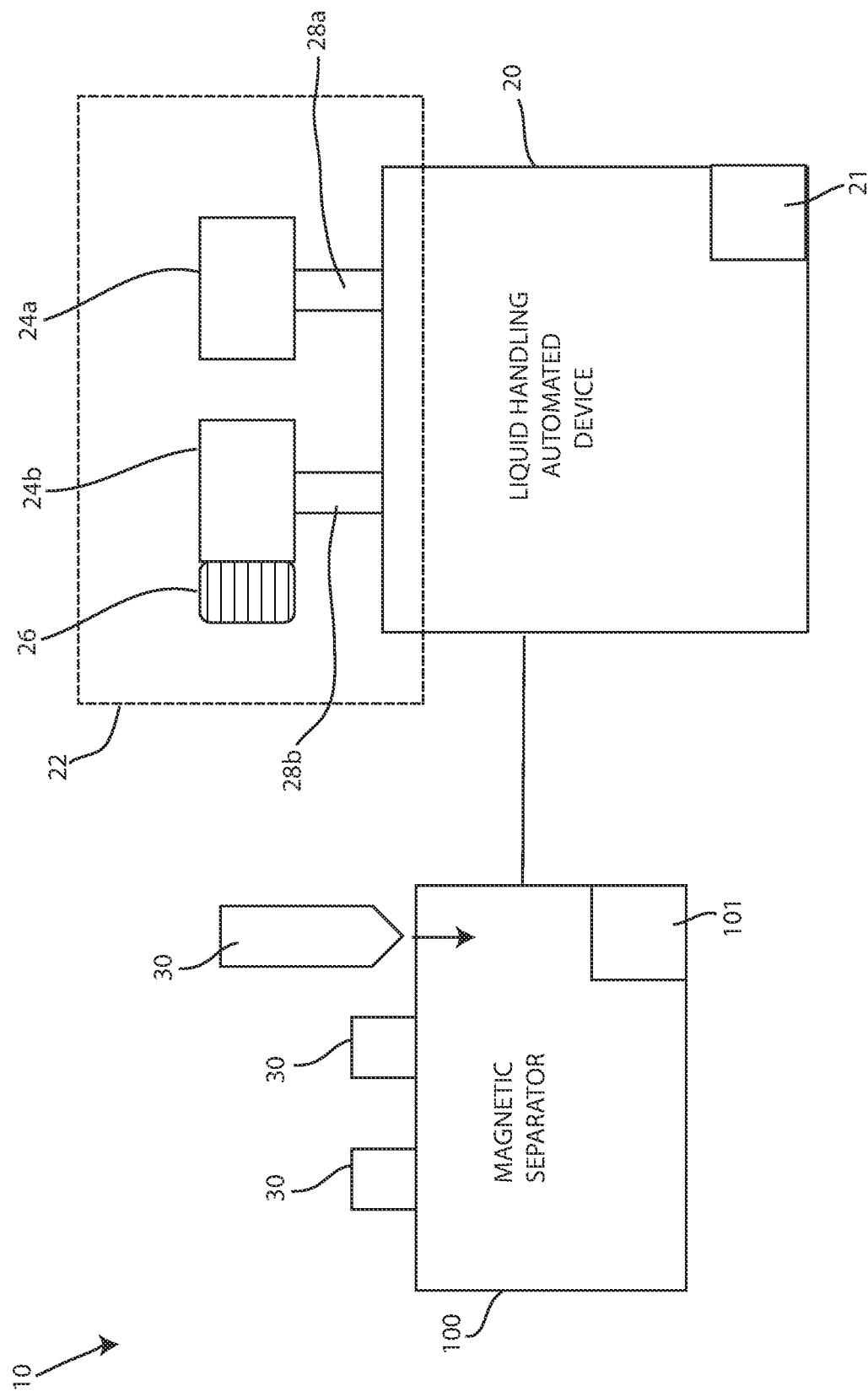
FIG. 1 depicts a schematic view of a pipetting robot system having a magnetic separator in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

In accordance with embodiments described herein, a liquid handling system is described. More particular, a magnetic separator for a liquid handling system is described which is configured to perform a separation process on liquids, suspensions or the like that are contained in a consumable being held in the magnetic separator. Hereinafter, "consumable" may be any container of liquids or suspensions, for example—but not limited to—tubes, microtubes, vacutainers, tube arrays, microplates of all sizes, microchips, petri dishes, strips and the like. A consumable may be configured to be provided to the magnetic separator by the liquid handling system in an automated manner, or by a technician who may provide the consumable into a receiver of the magnetic separator.

The magnetic separator may be configured to apply a magnetic field within the consumable to act upon beads located within the liquid or suspension contained in the consumable. The magnetic separator is configured with a movement system for moving the magnet(s) contained in the magnetic separator close to, or touching, the consumable held by the separator. This movement system may be configured to move the magnet(s) in at least two directions (i.e along both a vertical axis and a horizontal axis) in order to adapt the movement of the magnet(s) to a shape of the consumable. Since the magnetic field strongly depends on the distance between the magnet and the beads within the consumable, the movement system is configured to move the magnet(s) along the external shape of the consumable(s) with which they correspond. This two-axial movement is configured to prevent the magnetic field from being reduced due to a magnet being far from a wall of the consumable, particularly in the case that a consumable is not uniform, such as with a tube having a conically shaped end.

Further, embodiments disclosed herein seek to ensure that the magnetic field of the magnet on the beads within the consumable is reduced or removed during the binding process prior to the separation process. Residual magnetic fields from a magnetic separator have been found to be problematic during the binding process, and may jeopardize the experiment workflow at this stage. Embodiments here seek to reduce or eliminate this problem.

FIG. 1 depicts a schematic view of a liquid handling system 10 having a magnetic separator 100 in accordance with one embodiment. The liquid handling system 10 further includes a liquid handling automated device 20. The magnetic separator 100 may include a control system 101 for controlling functionality thereof. The liquid handling automated device 20 may also include a control system for controlling the functionality thereof. In some embodiments, the liquid handling automated device 20 and the magnetic separator 100 may be a single unit having a combined control system for controlling both systems.

The liquid handling automated device 20 includes a liquid handling movement system 22, one or more heads 24a, 24b and at least one pipette 26. The liquid handling automated device 20 may include an automated arm 28a, 28b or other robotic "tool rack" that may be used to move the one or more heads 24a, 24b. The automated arms 28a, 28b may be movable in any manner, have any size or shape, and have any number of dimensional degrees of freedom, depending on the embodiment. The one or more heads 24a, 24b may include one or more heads 24a configured to engage with and move consumables 30 into and out of the magnetic separator 100. Further, another of the one or more heads 24b may have one or a plurality of the pipettes 26 attached. For example, the one or more heads 24b may include one or many aspiration and dispensing channel pipettes. In the event of a plurality of pipettes, the system may be configured to operate either synchronously or independently. The pipettes 26 may be configured to both aspirate and dispense fluid. The liquid handling automated device 20 may be configured to move the one or more heads 24b so that the pipettes 26 may engage with the consumables 30 within the magnetic separator 100, and the liquid or suspensions therein.

Various other movement systems are contemplated, such as a liquid handling automated device 20 that includes a single robotic arm where different heads may be selectively attachable. In other embodiments, the liquid handling automated device 20 may include any number of automated arms. In still other embodiments contemplated, the liquid handling may not be automated, and the functionality attributable to the arms and heads 24a, 24b may be performed manually by a technician. Whatever the embodiment, the magnetic separator 100 may be configured to receive a consumable 30 containing a liquid or suspension having beads therein, and the magnetic separator 100 may be configured to perform a magnetic binding process between the beads and the fluid or analyte therein.

Figure 2:
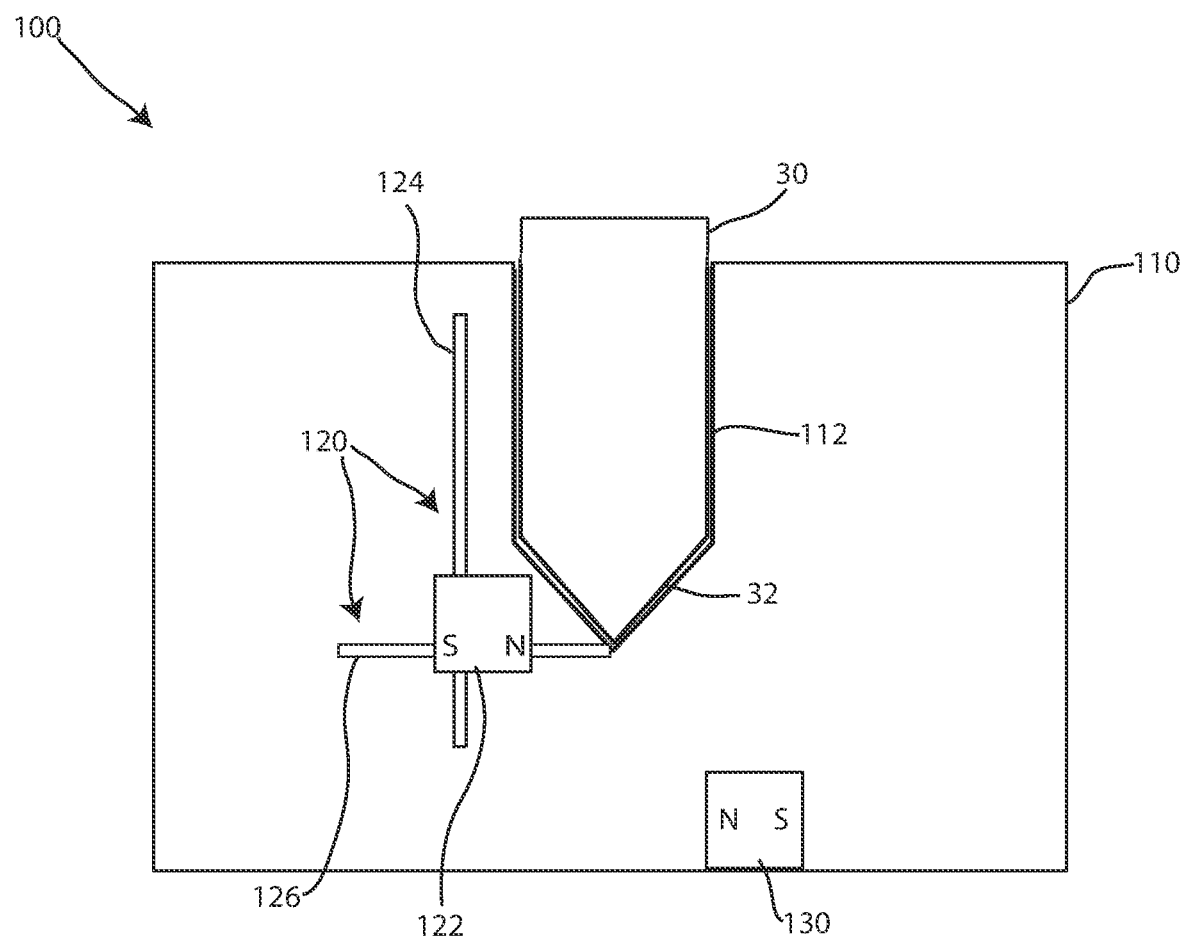
FIG. 2 depicts a schematic side view of the magnetic separator of FIG. 1, in accordance with one embodiment.

FIG. 2 depicts a schematic side view of the magnetic separator 100 of FIG. 1, in accordance with one embodiment. The magnetic separator 100 is shown including a base unit 110 having at least one consumable receiver 112 being dimensioned to receive a consumable 30 at least partially within the base unit 110. Within the magnetic separator 100 proximate the consumables 30 is a movement system 120 configured to move a separation magnet 122. The movement system 120 may be configured to move the magnets in two directions or directions, such as horizontally and vertically, via a vertical axis 124 and a horizontal axis 126. Thus, the separation magnet 122 may be configured to be moved proximate the consumable 30, and remain in contact with the consumable 30 as the separation magnet 122 is moved along the entire height of the consumable 30. Thus, the movement system 120 may be configured to adapt movement of the separation magnet 122 to the shape of the consumable 30, which is shown to include a conical bottom 32.

As shown, a stationary magnet 130 is located beneath the consumable 30. The stationary magnet 130 may be located at a vertical position or height that is at the bottom of the base unit 110. The movement system 120 may move capable of moving the separation magnet 122 at the same vertical location proximate the stationary magnet 130. The stationary magnet 130 may be configured to deflect a magnetic field line of the separation magnet 122 away from the consumable 30 received within the receiver 112 and to remove a residual magnetic field from the separation magnet 122 on beads located within the consumable 30. When brought to this position, the separation magnet 122 may be considered in a home location during which a binding process may occur between the analyte and beads found within the consumable 30 prior to separation by the separation magnet 122. Thus, instead of having opposing magnetic poles facing each other, the separation magnet 122 and the stationary magnet 130 may include like magnetic poles facing each other. As shown, the north pole of the separation magnet 122 is oriented toward the north pole of the stationary magnet 130.

Figure 3:
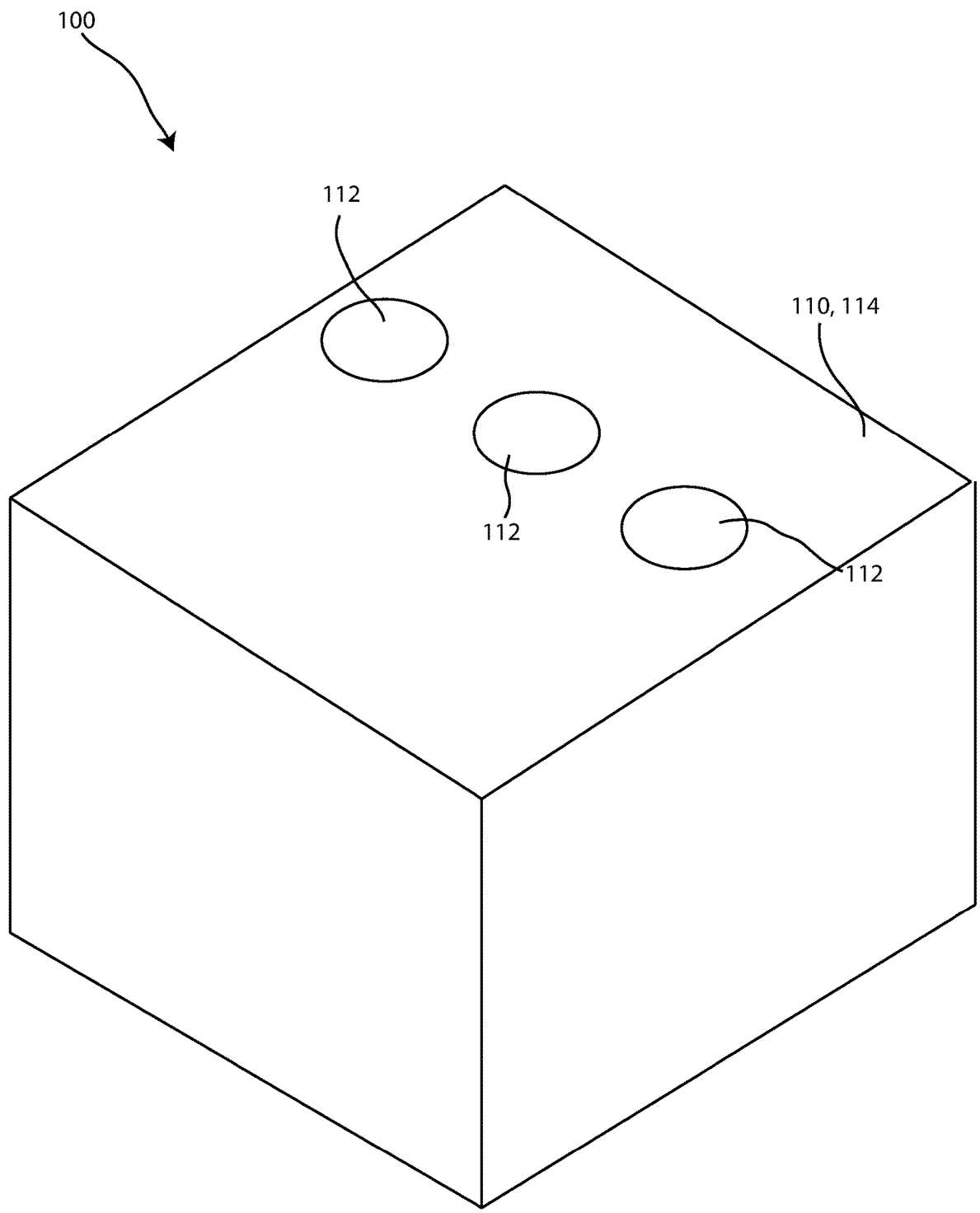
FIG. 3 depicts a perspective view of the magnetic separator of FIGS. 1 and 2, in accordance with one embodiment.

FIGS. 3-6 depict one exemplary embodiment of the magnetic separator 100. FIG. 3 depicts a perspective view of the magnetic separator 100. The magnetic separator 100 is shown including the base unit 110 having an outer housing 114 that is shown at least partially removed in FIGS. 4-6. The base unit 110 is shown including three separate receivers 112 each dimensioned to receive one of the consumables 30. When received in the receivers 112, the consumables may be at least partially within the outer housing 114 of the base unit 110. While the receivers 112 are shown as having the same dimensions in the embodiment shown, the invention is not limited in this respect. Other embodiments may include any number of receivers; some embodiments may include differently dimensioned receivers relative to other receivers in the base unit 110. The base unit 110 may be configured to receive any type of consumable. Further, the receivers 112 may be adaptable to expand or contract either automatically or via manipulation by a technician in order to flexibly be capable of receiving consumables having different shapes and sizes.

Figure 4:
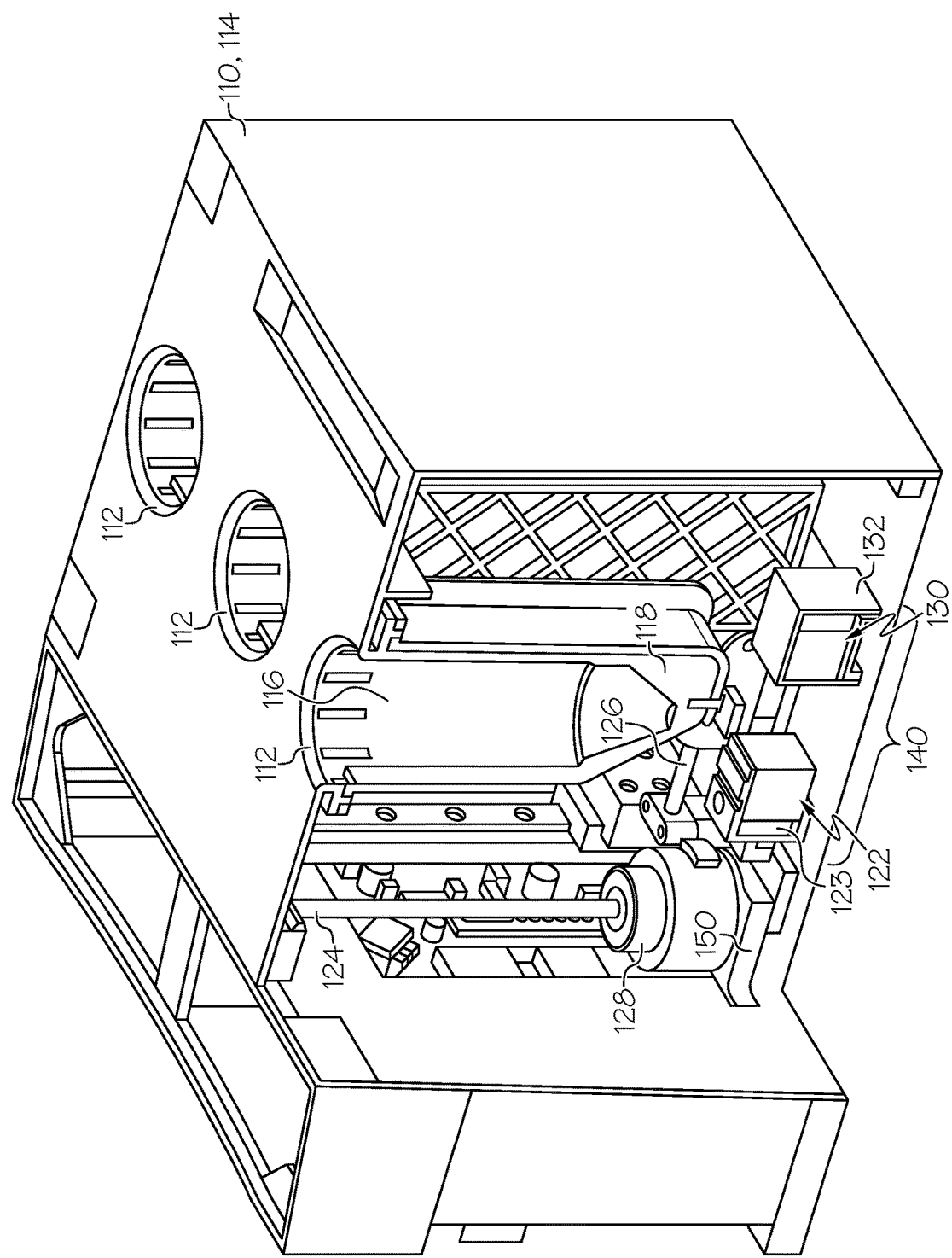
FIG. 4 depicts a perspective cutaway view of the magnetic separator of FIGS. 1 and 2 with a magnet system in a home position, in accordance with one embodiment.

FIG. 4 depicts a perspective cutaway view of the magnetic separator 100 of FIGS. 1 and 2 with a magnet system 140 in a home position, in accordance with one embodiment. In the home position, the separation magnet 122 is located proximate the stationary magnet 130. As shown, in the home position the stationary magnet 130 is configured to deflect a magnetic field line of the separation magnet 122 away from the consumable (not shown) received within the receiver 112 and to remove a residual magnetic field from the separation magnet 122 on beads located within the consumable. This home position may be utilized when the beads are binding to the analyte within the consumable, prior to a magnetic separation process. Because the separation magnet 122 is proximate a stationary magnet 130 configured to reduce or otherwise remove the residual magnetic field from the separation magnet 122 on the location occupied by the consumable, the separation magnet 122 may be kept closer to the consumable in the home position than otherwise would be desirable without the stationary magnet 130 acting on the magnetic field. In other words, without the stationary magnet 130 acting to reduce the magnetic field of the separation magnet 122, the separation magnet 122 may be required to move much further from the consumable in the home position during the binding process to achieve the same effect on the consumable location (i.e. no residual magnetic field, or a significantly reduced residual magnetic field).

Each of the three separate receivers 112 is shown to include a main portion 116 having a cylindrical profile that extends from the top of the outer housing 114 of the base unit 110. Each of the separate receivers 112 includes a conical shaped bottom 118 extending from the main portion 116. The receivers 112 may thus be configured to receive and retain a consumable having the same shape. The receivers 112 contemplated herein are not limited to this shape or dimensional characteristics. Any shaped receiver is contemplated. For example, adaptable receivers capable of receiving consumables of multiple shapes are also contemplated. Whatever the embodiment, the separate receivers 112 may provide a predetermined location within which a consumable 30 may be placed and be held by the magnetic separator 100 in a manner whereby a pipette 26 from the liquid handling system 10 can interact with the received consumable 30 by dispensing liquid therein and aspirating liquid therefrom.

Figure 5:
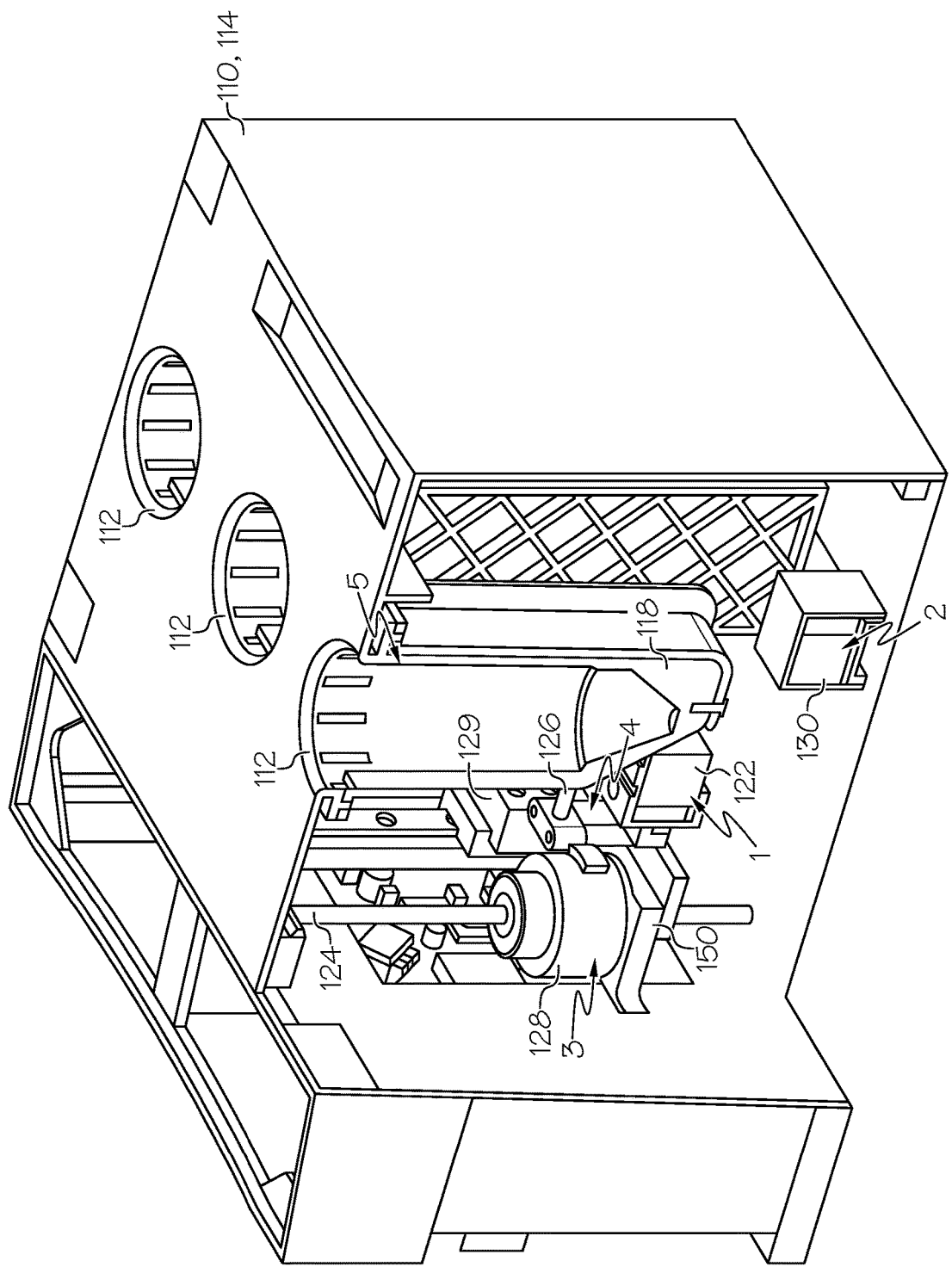
FIG. 5 depicts a perspective view of the magnetic separator of FIGS. 1 and 2 with a magnet system in a low position, in accordance with one embodiment.
Figure 6:
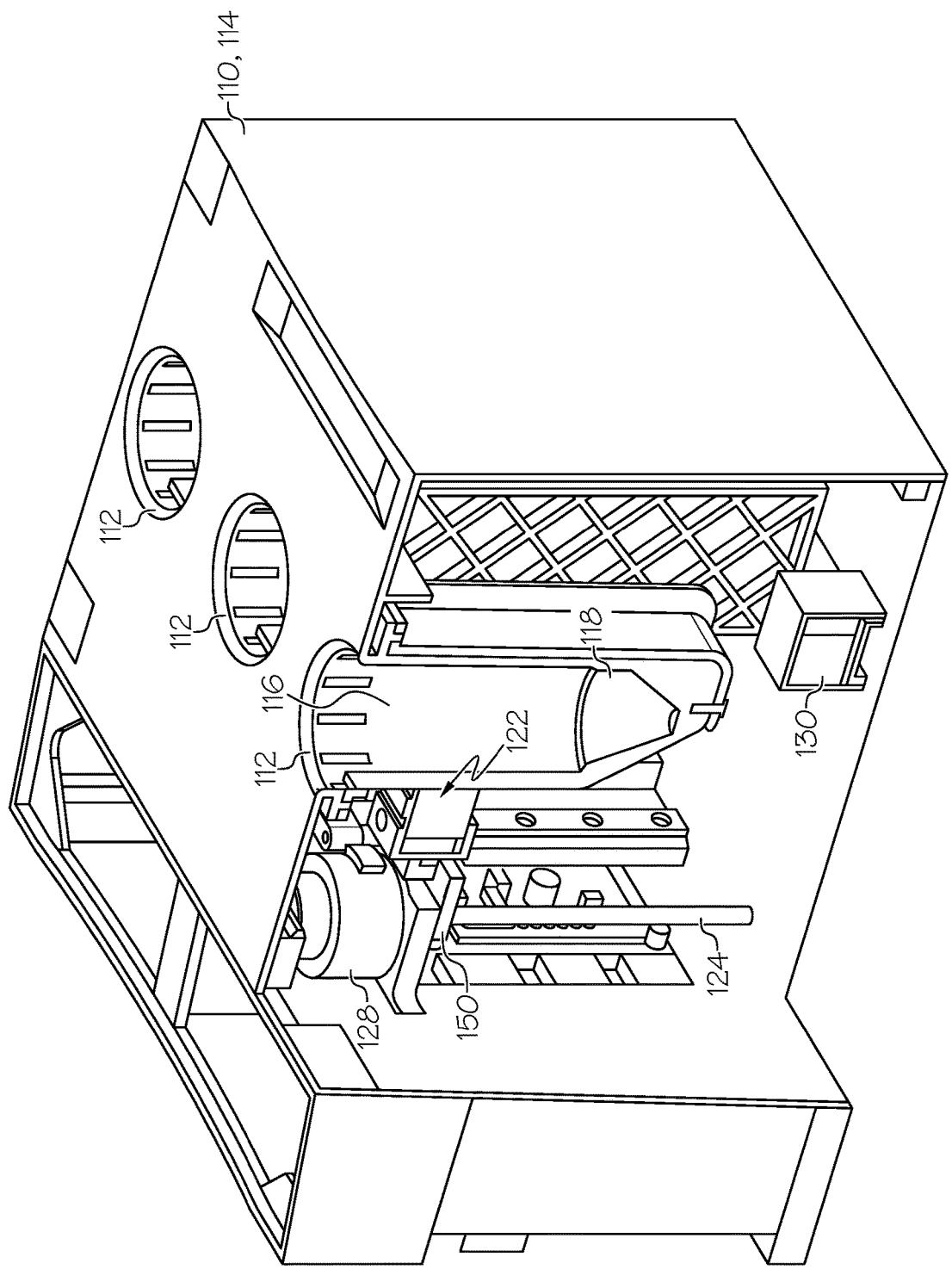
FIG. 6 depicts a perspective view of the magnetic separator of FIGS. 1 and 2 with a magnet system in a high position, in accordance with one embodiment.

As shown, the magnet system 140 includes a movement system including the vertical axis 124 and the horizontal axis 126. The movement system further includes a linear screw drive system 128 surrounding the vertical axis 124. A frame 150 supports the linear screw drive system 128. Attached to the frame is a magnet holder 123 which holds the separator magnet 140 in a fixed vertical position with respect to the frame 150. The frame 150 is configured to move up and down along the vertical axis 124 and provide vertical movement of the separation magnet 122. Similarly, the magnet holder 123 is further configured to move along the horizontal axis 126, as shown in FIGS. 5-6 herein below. As shown, a vertical rail 129 having a supporting bearing system is shown for supporting vertical movement of the frame 150.

The magnetic separator 100 shown in FIG. 4 includes the three separate receivers 112. As such, while not shown there may be three separate separation magnets 122, two of which are hidden from view. The three separation magnets 122 may be configured to move in unison in one embodiment. For example, the frame 150 may be a singular frame that extends along the width within the magnetic separator 100 across each of the three separate receivers 112. The hidden separation magnets may be attached to the frame 150 proximate each of the other two locations in the same manner as shown with the separation magnet 122. In other embodiments, a separately controllable and independent axis system may be included for each of the two hidden separation magnets allowing for completely independent movement thereof.

FIG. 5 depicts a perspective view of the magnetic separator 100 of FIGS. 1 and 2 with the magnet system 140 in a low position, in accordance with one embodiment. As shown, relative to the home position, the frame 150 and the separator magnet 122 have been moved upward vertically along the vertical axis 124. Further, the separator magnet 122 has been moved along the horizontal axis 126 in the direction of the receiver 112 in order to adapt to the conical shape of the consumable and/or outer wall of the receiver 112. Thus, the separation magnet 122 is shown remaining in contact, or in very close proximity, with the receiver 112. In particular, the top right corner of the separation magnet 122 is shown to be in contact, or very close proximity to, with the outer wall of the receiver 112. In other embodiments in which the receiver 112 does not include a fully enclosed outer wall that separates the consumable from the separation magnet 122, the separation magnet 122 may directly contact, or be in very close proximity to, the consumable. In still other embodiments, the movement system may be configured to impart a rotational motion on the separation magnet 122. For example, it may be desirable to rotate the separation magnet 122 so that an entire side of the cube-shaped magnet contacts the conical outer wall of the receiver 112, instead of only a top edge.

FIG. 6 depicts a perspective view of the magnetic separator 100 of FIGS. 1 and 2 with the magnet system 140 in a high position, in accordance with one embodiment. As shown, relative to the low position of FIG. 5, the frame 150 and the separator magnet 122 have been moved upward vertically further along the vertical axis 124. Further, the separator magnet 122 has been moved along the horizontal axis 126 backward in the direction of the vertical axis 124 in order to adapt to the expanding shape of the consumable and/or outer wall of the receiver 112. This may be the highest position that the separator magnet 122 is capable of achieving relative to the receiver 112. In this position, the separator magnet 122 may be in contact or very close proximity with the main body 116 of the receiver.

Figure 7:
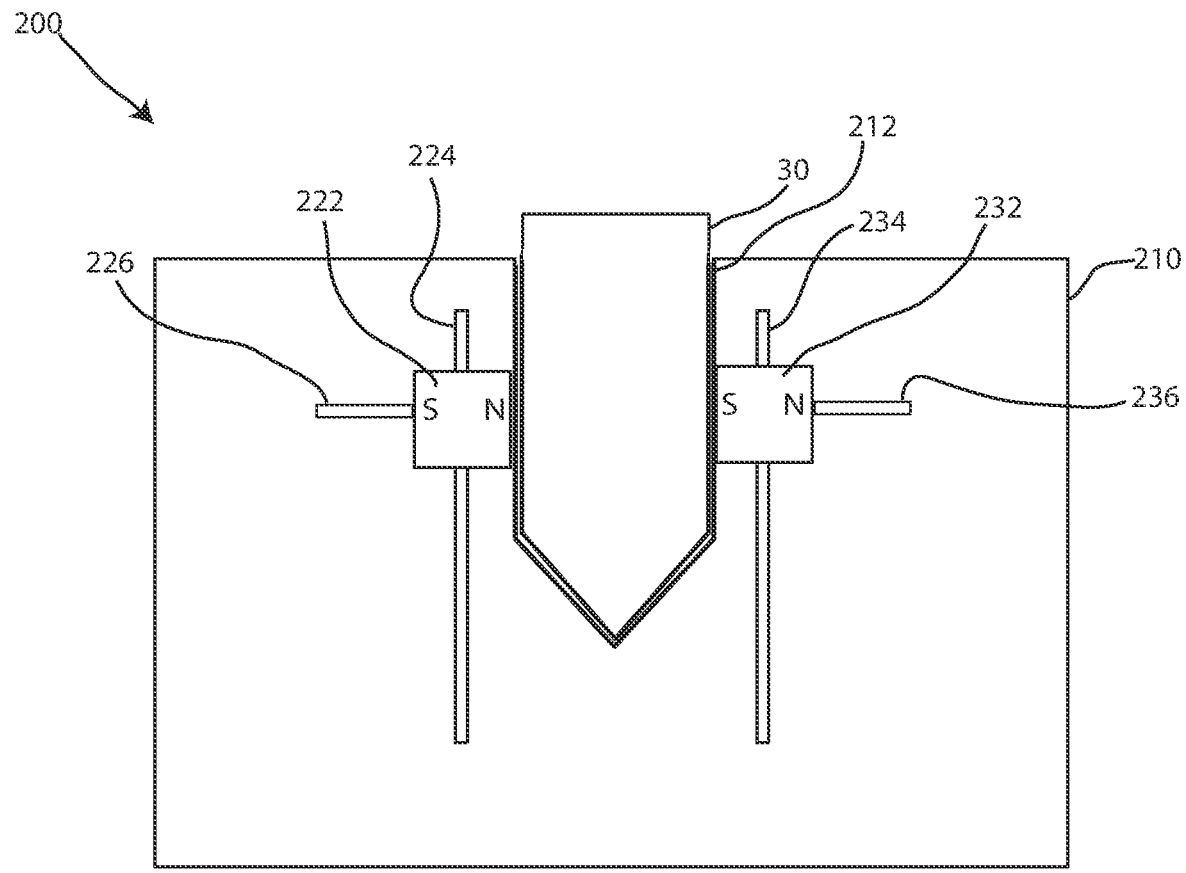
FIG. 7 depicts a schematic view of another magnetic separator, in accordance with one embodiment.

FIG. 7 depicts a schematic view of another magnetic separator 200, in accordance with one embodiment. The magnetic separator 200 may be similar to the magnetic separator 100. Thus, the magnetic separator may include a movement system for moving a first separation magnet 222 via a vertical axis 224 and a horizontal axis 226. For example, this movement may be accomplished in the manner as described hereinabove. Unlike the above embodiment, the stationary magnet has been replaced by a second movement system for moving a second separation magnet 232 via a second vertical axis 234 and a second horizontal axis 236. The second separation magnet 232 may be located on an opposite side of a receiver 112 and/or the consumable 30 therein as the first separation magnet 222. During separation, the first separation magnet 232 and the second separation magnet 232 may include opposite magnetic poles that are facing each other in order to enhance the magnetic field in the consumable 30 located within a receiver 212. The first and second magnets 222, 232 may each be movable in at least two directions (e.g. horizontal and vertically) in order to adapt to the shape of the consumable.

Figure 8:
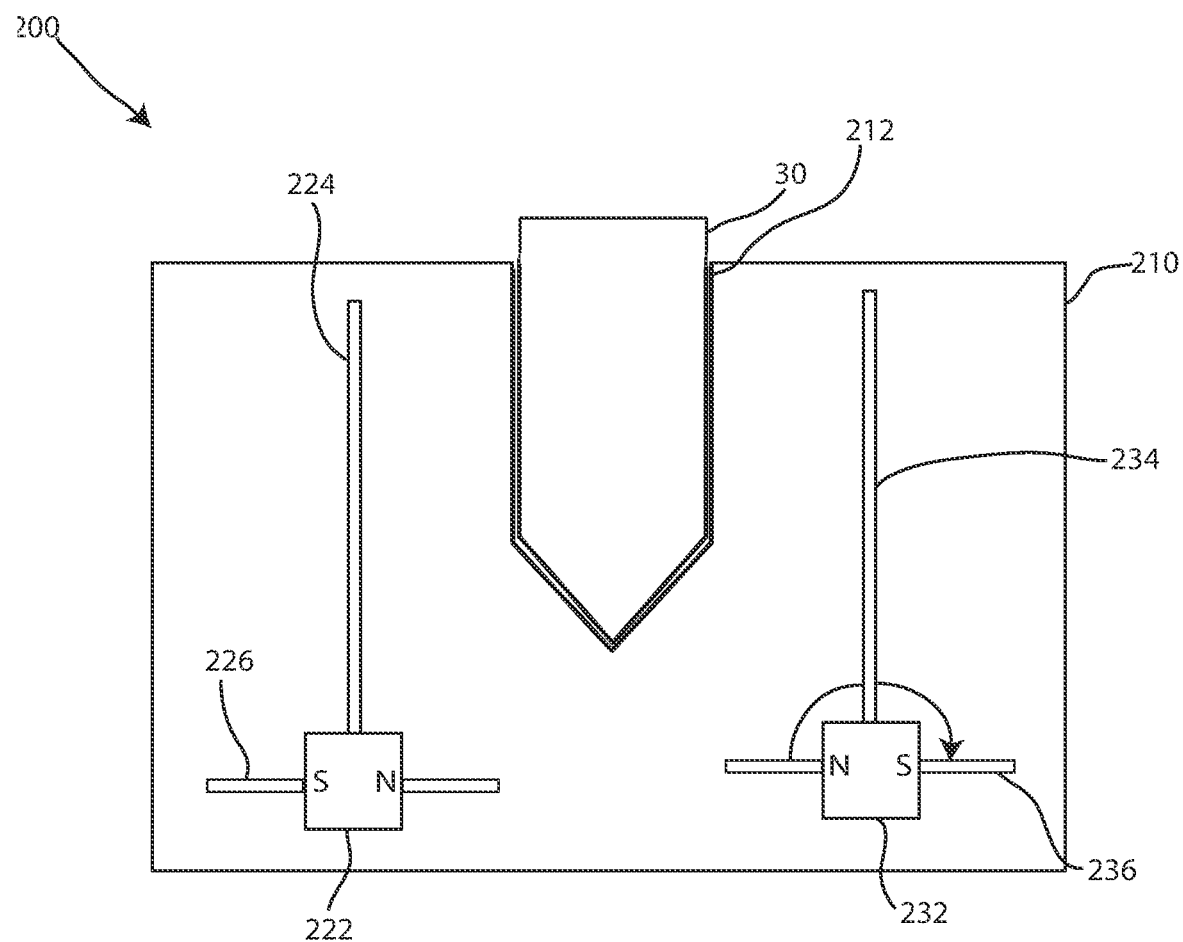
FIG. 8 depicts a schematic view of the magnetic separator of FIG. 7 with a second magnet rotated relative to a first magnet, in accordance with one embodiment.

FIG. 8 depicts a schematic view of the magnetic separator 200 of FIG. 7 with the second magnet 236 rotated relative to the first magnet 222, in accordance with one embodiment. Thus, rather than including a stationary magnet, it is further contemplated that the second magnet 236 may be rotated so that the poles of the second magnet 236 become oriented 180 degrees from the orientation during a separation process. In this manner, the first and second separation magnets 222, 232 may include like poles facing each other for reducing a residual magnetic field during a binding step. Once the binding process is complete and the separation process is begun, the second separation magnet 232 may be configured to rotate back to its separation orientation in which the opposite poles of the first and second magnets 222, 232 once again face each other.

Methods of separating beads are also contemplated by the present invention. Methods described herein may be performable by the magnetic separator. Functionality of the magnetic separators in accordance with methods described herein may be controlled by a control system of the magnetic separator and/or liquid handling system, such as the control system 101 of the magnetic separator 100 and/or the control system 21 of the liquid handling system 20.

Methods may first include receiving a consumable, such as the consumable 30, by a receiver, such as the receiver 112, of a base unit, such as the base unit 110, of a magnetic separator, such as the magnetic separator 100, for a liquid handling system, such as the liquid handling system 10. The method may include performing, by the magnetic separator, a separation of beads located within the consumable by moving a first separation magnet of the magnetic separator, such as the magnet 122, in proximity to the consumable. Methods may include moving, by a movement system, such as the movement system 120, the first separation magnet in at least two directions during the separation process.

Methods may further include deflecting the magnetic field of the first separation magnet away from the consumable by a second magnet of the magnetic separator, such as the stationary magnet 130. Methods may further include removing a residual magnetic field from the first separation magnet on the beads located within the consumable by the second magnet. To accomplish this, methods may include moving the first separation magnet in proximity of the second magnet such that the magnetic pole of the first magnet faces a matching magnetic pole of the second magnet.

In accordance with some methods, the moving of the first separation magnet may include moving the first separation magnet along a vertical axis in a vertical direction and moving the first separation magnet also along a horizontal axis in a horizontal direction. Thus, methods include moving the first separation magnet with at least two degrees of freedom or along two axis.

In accordance with methods described herein, the consumable may extend in a cylindrical shape having a conical bottom. In this case the moving the first separation magnet further includes moving, by the movement system of the magnetic separator, the first separation magnet vertically along one side of the cylindrical shape such that a portion of the magnet is in close proximity to the cylindrical shape of the received consumable. Methods may also include moving, by the movement system of the magnetic separator, the first separation magnet horizontally along one side of the conical bottom such that the portion or another portion of the magnet is in close proximity to the conical body. This may include keeping or otherwise remaining in contact, by the first separation magnet, with the consumable or the receiver along an entire vertical height of the consumable and receiver. In some embodiments methods may include the movement system rotating the first separation magnet in addition to moving the first separation magnet in the vertical and horizontal directions.

In some methods, more than one receiver may be included in the base unit. For example, in the event that the base unit includes at least three receivers, each being dimensioned to receive a separate consumable in a predefined location at least partially within the base unit, methods include the first separation magnet performing separation of beads located in the consumable within a first of the at least three receivers. Methods may further include performing, by the magnetic separator, a separation of beads located within a second consumable located in a second of the at least three receivers by moving a second separation magnet of the magnetic separator in proximity to the second consumable and moving, by a movement system of the magnetic separator, the second separation magnet in at least two directions during the separation. Still further, methods may include performing, by the magnetic separator, a separation of beads located within a third consumable located in a third of the at least three receivers by moving a third separation magnet of the magnetic separator in proximity to the third consumable and moving, by a movement system of the magnetic separator, the third separation magnet in at least two directions during the separation. In some embodiments, methods may include moving each of the first, second and third separation magnets in unison. Other methods may include moving each of the first, second and third separation magnets independently.

Still other methods may include performing separation of beads located within the consumable with two opposing magnets located on each side of the consumable, and having opposing poles facing each other. Methods may include moving each of the magnets in unison, where one or both magnets are moved in a manner that adapts to the shape of the consumable. Methods may further include rotating between a first and second position, one of the two magnets, in order to change the direction of the pole 180 degrees so that the magnetic field is opposite in the second position relative to the first position. This rotation may accomplish removing a residual magnetic field from the first separation magnet on the beads located within the consumable by the second magnet.

In still other embodiments, methods include detecting, by a control system, the dimensions of either the receiver or the received consumable, and automatically determining a movement process for the first separation magnet for performing separation of beads.

While the invention has been shown and described with reference to specific embodiments, it should be understood by those skilled in the art that various changes in form and detail may be made therein without departing from the spirit and scope of the invention as recited in the accompanying claims.

What is claimed is:

1. A magnetic separator for a liquid handling system comprising:
    a base unit having at least one receiver which extends in a cylindrical shape and includes a conical bottom, the at least one receiver being dimensioned to receive a consumable in the at least one receiver at a predefined location at least partially within the base unit; and
    a magnet system located within the base unit proximate to the at least one receiver, the magnet system including:
        a first separation magnet configured to perform separation of beads located within the consumable when the first magnet is located proximate to the consumable; and
        a movement system including a vertical axis configured to move the first separation magnet in a vertical direction and a horizontal axis configured to move the first separation magnet in a horizontal direction, the movement system configured to move the first separation magnet in the vertical direction and the horizontal direction in order to move the first separation magnet to adapt to the cylindrical shape and the conical bottom of the at least one receiver such that the first separation magnet remains in contact or close proximity with the consumable along a vertical height of the consumable during the separation process.

2. The magnetic separator of claim 1, wherein the magnet system further includes:
    a stationary magnet located in a stationary position within the base unit, wherein the stationary magnet is configured to deflect a magnetic field line of the first separation magnet away from the consumable received within the at least one receiver and to remove a residual magnetic field from the first separation magnet on beads located within the consumable.

3. The magnetic separator of claim 1, wherein the vertical axis is configured to move the first separation magnet in a vertical direction and the horizontal axis is configured to move the first separation magnet in a horizontal direction.

4. The magnetic separator of claim 1, wherein the at least one receiver is dimensioned to receive the consumable that extends in the cylindrical shape having the conical bottom, and wherein the movement system is configured to move the first separation magnet vertically along one side of the cylindrical shape such that a portion of the first separation magnet is in close proximity to the cylindrical shape of the received consumable, and wherein the movement system is configured to move the first separation magnet horizontally along one side of the conical bottom such that the portion or another portion of the first separation magnet is in close proximity to the conical body.

5. The magnetic separator of claim 4, wherein the first separation magnet is configured to remain in contact with the at least one receiver along an entire vertical height of the receiver.

6. The magnetic separator of claim 1, wherein the base unit includes at least three receivers, each being dimensioned to receive a separate consumable in a predefined location at least partially within the base unit, wherein the first separation magnet is configured to perform separation of beads located in the consumable within a first of the at least three receivers when the first separation magnet is located proximate the consumable, and wherein the magnet system further includes:
    a second separation magnet configured to perform separation of beads located within a second consumable within a second of the at least three receivers when the second separation magnet is located proximate the second consumable; and
    a third separation magnet configured to perform separation of beads located within a third consumable within a third of the at least three receivers when the third separation magnet is located proximate the third consumable.

7. The magnetic separator of claim 6, wherein the movement system is configured to move the first separation magnet, the second separation magnet, and the third separation magnet in unison.

8. The magnetic separator of claim 6, wherein the movement system is configured to move the first separation magnet, the second separation magnet, and the third separation magnet independently.

9. The magnetic separator of claim 3, wherein the first separation magnet is configured to rotate.

10. The magnetic separator of claim 1, wherein the magnet system further includes:
    an opposing separation magnet configured to perform separation of beads located within the consumable when the opposing separation magnet is located proximate to the consumable,
    wherein the movement system is configured to move the opposing separation magnet in at least two directions in order to adapt to a shape of the consumable, and wherein the opposing separation magnet is located on an opposite side of the at least one receiver as the first separation magnet.

11. The magnetic separator of claim 10, wherein the opposing separation magnet is configured to rotate between a first position and a second position, wherein in the first position the magnetic field of the opposing separation magnet is in a first orientation and wherein in the second position the magnetic field of the opposing separation magnet is in a second orientation that is opposite the first orientation.

12. The magnetic separator of claim 1, further comprising:
    a control system configured to detect the dimensions of at least one of the at least one receiver and the received consumable, wherein the control system is configured to automatically determine a movement process for the first separation magnet for performing separation of beads.

13. A liquid handling system comprising:
    a magnetic separator including:
        a base unit having at least one receiver which extends in a cylindrical shape and includes a conical bottom, the at least one receiver being dimensioned to receive a consumable in the at least one receiver at a predefined location at least partially within the base unit; and
        a magnet system located within the base unit proximate to the at least one receiver, the magnet system including:
            a first separation magnet configured to perform separation of beads located within the consumable when the first separation magnet is located proximate to the consumable; and
            a movement system including a vertical axis configured to move the first separation magnet in a vertical direction and a horizontal axis configured to move the first separation magnet in a horizontal direction, the movement system configured to move the first separation magnet in the vertical direction and the horizontal direction in order to allow the movement of the first separation magnet to adapt to the cylindrical shape and the conical bottom of the at least one receiver such that the first separation magnet remains in contact or close proximity with the consumable along a vertical height of the consumable during the separation process; and
    a liquid handling automated device including:
        a liquid handling movement system
        a head configured to be moved by the liquid handling movement system; and
        at least one pipette attached to the head and configured to be insertable into and retractable from the at least one receiver of the base unit of the magnetic separator, the pipette configured to aspirate and dispense liquid from the consumable received in the at least one receiver.

14. A method of separating beads comprising:
    providing the magnetic separator for the liquid handling system of claim 1;
    receiving the consumable by the receiver of the base unit of the magnetic separator for the liquid handling system;
    performing, by the magnetic separator, a separation of beads located within the consumable by moving the first separation magnet of the magnetic separator in proximity to the consumable; and
    moving, by the movement system of the magnetic separator, the first separation magnet in at least two directions during the separation.

15. The method of claim 14, further comprising:
    deflecting the magnetic field of the first separation magnet away from the consumable by a second magnet of the magnetic separator; and
    removing a residual magnetic field from the first separation magnet on the beads located within the consumable by the second magnet.

16. The method of claim 15, wherein the second magnet is a stationary magnet within the magnetic separator, the method further comprising:
    moving the first separation magnet in proximity of the second magnet.

17. The method of claim 14, wherein the moving the first separation magnet further includes:
    moving the first separation magnet along a vertical axis in a vertical direction; and
    moving the first separation magnet along a horizontal axis in a horizontal direction.

18. The method of claim 14, wherein the consumable extends in the cylindrical shape having the conical bottom, wherein the moving the first separation magnet further includes:

moving, by the movement system of the magnetic separator, the first separation magnet vertically along one side of the cylindrical shape such that a portion of the magnet is in close proximity to the cylindrical shape of the received consumable; and moving, by the movement system of the magnetic separator, the first separation magnet horizontally along one side of the conical bottom such that the portion or another portion of the magnet is in close proximity to the conical body.

19. The method of claim 18, further comprising:

remaining in contact, by the first separation magnet, with the consumable or the receiver along an entire vertical height of the consumable and receiver.

20. The method of claim 14, wherein the base unit includes at least three receivers, each being dimensioned to receive a separate consumable in a predefined location at least partially within the base unit, wherein the first separation magnet performs separation of beads located in the consumable within a first of the at least three receivers, and wherein the method further includes:

performing, by the magnetic separator, a separation of beads located within a second consumable located in a second of the at least three receivers by moving a second separation magnet of the magnetic separator in proximity to the second consumable and moving, by a movement system of the magnetic separator, the second separation magnet in at least two directions during the separation; and performing, by the magnetic separator, a separation of beads located within a third consumable located in a third of the at least three receivers by moving a third separation magnet of the magnetic separator in proximity to the third consumable and moving, by a movement system of the magnetic separator, the third separation magnet in at least two directions during the separation.

21. The magnetic separator of claim 1, wherein the movement system is located along a side of the at least one receiver, wherein the movement system is configured to move the first separation magnet vertically along one side of the cylindrical shape of the at least one receiver such that a portion of the first separation magnet is in close proximity to the cylindrical shape of the at least one receiver, and wherein the movement system is configured to move the first separation magnet horizontally along one side of the conical bottom such that the portion or another portion of the first separation magnet is in close proximity to the conical bottom.

* * * * *